W. P. HAMMOND.
DUST CAP FOR VALVES OF PNEUMATIC TIRES.
APPLICATION FILED AUG. 12, 1910.
1,302,792.
Patented May 6, 1919.
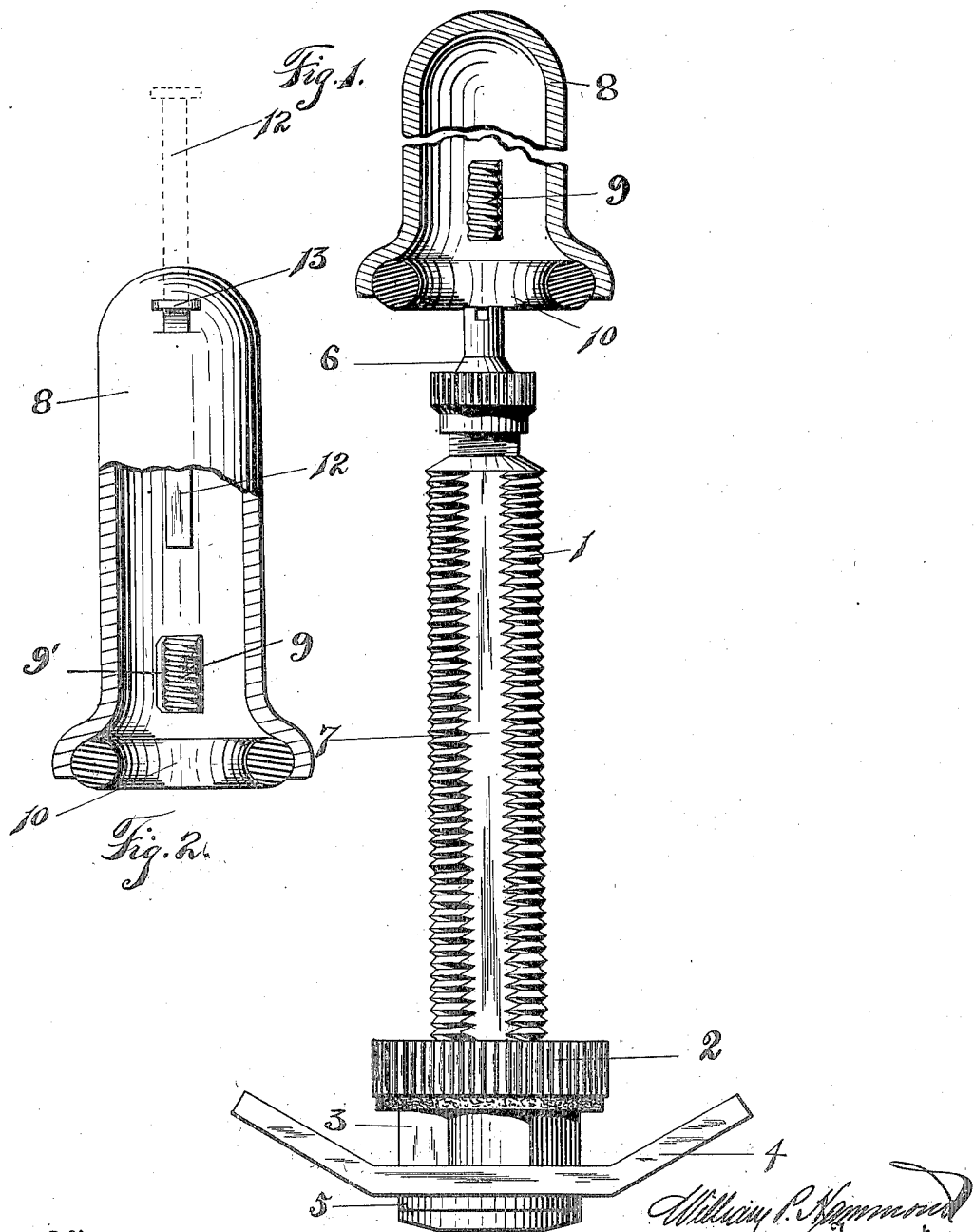

UNITED STATES PATENT OFFICE.

WILLIAM P. HAMMOND, OF PASSAIC, NEW JERSEY, ASSIGNOR TO A. SCHRADER'S SON, INC., OF NEW YORK, N. Y., A CORPORATION OF NEW YORK.

DUST-CAP FOR VALVES OF PNEUMATIC TIRES.

1,302,792.          Specification of Letters Patent.         Patented May 6, 1919.

Application filed August 12, 1910. Serial No. 576,847.

*To all whom it may concern:*

Be it known that I, WILLIAM P. HAMMOND, a citizen of the United States, and a resident of the city and county of Passaic, State of New Jersey, have invented certain new and useful Improvements in Dust-Caps for Valves of Pneumatic Tires, of which the following, taken in connection with the accompanying sheet of drawing, forms a complete and concise description.

To mount a dust cap as heretofore used upon a valve casing of an automobile tire requires not only considerable labor, but also quite some time, owing to the fact that the cap requires to be screwed down upon the threads of the valve casing until it engages the rim nut. This process necessitates in some instances from thirty to thirty-five complete revolutions of the cap, and when this is multiplied by four, the number of valves of each automobile, it will be apparent that the total of at least one hundred and twenty turns required before the cap is in place will consume a material amount of time. It is for this reason that not infrequently it is found that chauffeurs and owners dispense entirely with these dust caps, notwithstanding the fact that it is desirable to use them.

My invention has for an object the production of a dust cap which can be mounted upon the valve casing instantly and without trouble, merely by slipping the same over the casing and with a sliding movement envelop the same to the extent allowed by the rim securing nut, and then with a slight rotary movement lock the same in an effective holding position.

Another object of my invention is to produce a dust and water tight joint at the meeting of the cap and the rim nut, so that it will be impossible for either water or dirt to filter through the space caused by the chamfered surface of the valve casing, to the tire tube.

To the accomplishment of this, as well as other objects that will manifest themselves on reading the following specification, I will proceed to describe the illustrated embodiment of my invention, which is a preferable means of its accomplishment, not restricting myself, however, to this described means, but reserving a fair range of equivalents which may be resorted to to effect the object of my invention.

In the drawing, Figure 1 is a view in side elevation of a complete automobile tire valve, and the dust cap made according to my invention in vertical section. Fig. 2 is a sectional view, partly in elevation, showing a modification.

—1— indicates the complete valve as now generally used, and which consists of the stem portion, securing nuts and parts 2, 3, 4 and 5, an interior check valve mechanism (not shown) and a cap —6—, all of which is of usual and well known construction. The valve casing is screw-threaded along its entire longitudinal length and is provided with two chambered or flat sides —7— formed by either cutting away the threads or by threading in the first instance a tube of like cross section.

The dust cap is indicated at —8— and is of dome shape and drawn to any desired length. In the interior peripheral surface of this cap are formed two longitudinal rows, diametrically opposite each other, of grooves or screw threads —9—, the threads being of proper length to permit the same to pass freely along the flat sides —7— of the valve casing when the cap is mounted thereon, and still of sufficient length to form a substantial engagement with the threads of the valve casing when the cap is given its partial rotary movement.

I have found in practice that it is desirable to use a resilient washer —10— between the end of the cap —8— and the rim nut —2—, in order to effect a good joinder between these parts, owing to the fact that the rim nut —2— may in some instances lap to some extent the next adjacent thread above it, due to the varying thicknesses of rims to which they are attached. The result of this is that the threads of the cap cannot pick this thread up when rotated. By using the washer —10— it is possible, owing to its resiliency which permits of sufficient amount of compression that is necessary, to bring the threads on the cap into proper alinement with the lowest thread on the casing. This washer further serves the purpose of obtaining greater stability of connection between the cap and the rim nut and casing. The washer —10— is mounted and retained within the flared end 11 of the cap, as shown, so that the washer and cap may be ordinarily inseparable and sold as a unit.

I have also found it desirable to close one end of the threads, as shown at —9'— in the modification illustrated in Fig. 2, so that when the cap is given its rotary movement to position it, the cap threads will not be permitted to ride over and past the casing threads to the opposite flat side, which would otherwise happen if rotated too far, and thus result in the cap becoming loose.

I may also equip the cap with the slide rod —12— having an operating flange or lip —13— mounted and operating in a slot in the dome as shown, the purpose of which is to prevent rotation or loosening of the cap when in position. This is accomplished by sliding the rod —12— into the space between the flat side of the casing and the cap.

Having thus described my invention what I claim as new herein and desire to secure by Letters Patent is:—

1. A device of the character described including a tire valve casing having the exterior thereof provided with threads and said threads being mutilated upon one side of the valve casing, a dust cap adapted to fit over and house the tire valve casing and having the mouth thereof flared outwardly, said dust cap being provided upon the interior thereof with a threaded portion which is adapted to slide freely over the before mentioned mutilated portion of the threads of the valve casing and to interlock with the threads of the valve casing when the dust cap is rotated, and a compressible washer member arranged within the flared mouth of the dust cap so as to be compressed when the dust cap is seated in position and serve to hold the threads of the dust cap in a positive engagement with the threads of the valve casing.

2. A device of the character described including a tire valve casing having the exterior thereof provided with threads and said threads being mutilated on one side of the valve casing, a dust cap adapted to fit over and house the valve casing and provided upon the interior thereof with a threaded portion adapted to slip freely over the mutilated portion of the threads of the valve casing and to positively engage the threads of the valve casing when rotated, and a slide mounted upon the dust cap for engagement with the mutilated portion of the threads of the valve casing to hold the dust cap against rotation.

3. The combination with a valve casing provided with successive engaging portions, and a dust cap formed to be slipped over the valve casing to approximately the secured position of the dust cap, of resilient means adapted to be interposed between the dust cap and a relatively fixed part adjacent the valve casing, said resilient means being capable of being compressed by the hand of the operator in slipping the dust cap in place to enable engagement of an advanced engaging portion not free for engagement when said means is expanded, and means carried by the dust cap formed to engage said engaging portions, the parts coöperating to hold the cap firmly in place in the advanced position against vibrations under all normal conditions of use.

WILLIAM P. HAMMOND.

Witnesses:
P. FRANK SONNEK,
M. C. HAMMOND.